United States Patent [19]
Kelley

[11] Patent Number: 5,857,427
[45] Date of Patent: Jan. 12, 1999

[54] ANIMAL BOWL WITH RECESSED ACQUISITION FEATURE

[76] Inventor: Scott A. Kelley, Box 420446, Houston, Tex. 77242

[21] Appl. No.: 840,996

[22] Filed: Apr. 22, 1997

[51] Int. Cl.$^6$ ........................................................ A01K 5/00
[52] U.S. Cl. ................................................................ 119/61
[58] Field of Search .............................. 119/61, 51.5, 62, 119/63; D7/550, 543, 545, 302, 705, 622, 509, 507, 533

[56] References Cited

U.S. PATENT DOCUMENTS

| | | | |
|---|---|---|---|
| D. 232,564 | 8/1974 | Kissin | D7/545 |
| 2,772,660 | 12/1956 | Saul | 119/61 |
| 3,611,998 | 10/1971 | Loscalzo | 119/61 |
| 5,253,609 | 10/1993 | Partelow et al. | 119/61 |
| 5,277,149 | 1/1994 | East | 119/61 X |

*Primary Examiner*—Michael J. Carone
*Assistant Examiner*—Yvonne Abbott
*Attorney, Agent, or Firm*—Mark A. Tidwell

[57] ABSTRACT

The subject invention provides a bowl having recessed acquisition features that permit the bowl to be manipulated by humans without providing protrusions that could be grasped by an animal, through biting or otherwise. In one embodiment, the recessed acquisition feature is formed by two spaced apart slots recessed in the exterior wall of the bowl. Each slot is characterized by a first wall oriented to face the opposing slot and a second wall oriented to face the interior cavity, each wall being substantially vertical or negatively sloped to provide a lifting surface. The thumb and a finger are placed in these slots against gripping surfaces and squeezed towards one another. The bowl may also be raised by grasping the interior wall of the cavity and the substantially vertical or negatively sloped second wall of a slot between the thumb and fingers. In another embodiment, a recessed slot is shaped to have the natural curve of a human finger. The portion of the slot wall oriented to face the interior cavity is preferably substantially vertical or negatively sloped. The curved shape of the slot permits one to apply a lifting force on the bowl. In other embodiments, the acquisition feature is an inwardly sloping, vertical slot recessed at the base edge of the bowl. The inwardly sloping portion of the slot may consist of a tab or a portion of the exterior wall of the bowl. Again, a thumb or finger disposed in the recessed slot can be used to apply a lifting force to the bowl while a stabilizing force is exerted on the bowl's rim.

17 Claims, 6 Drawing Sheets

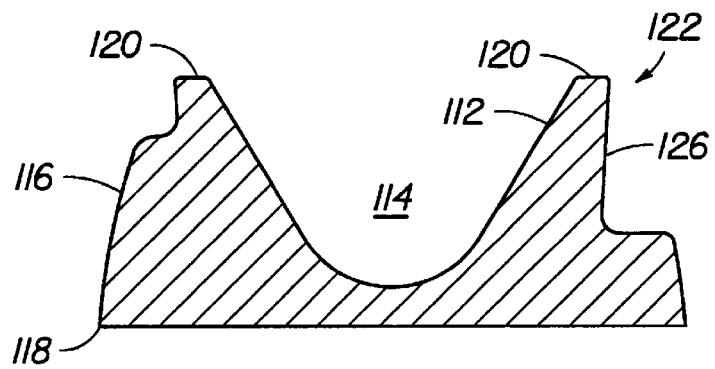
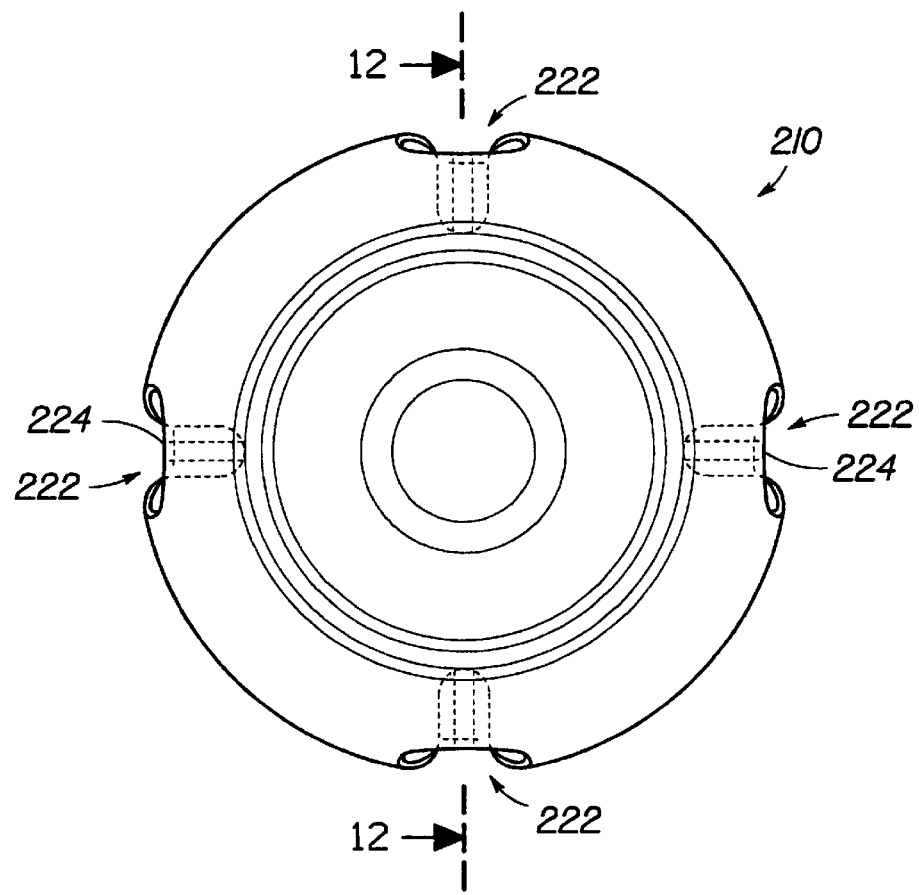
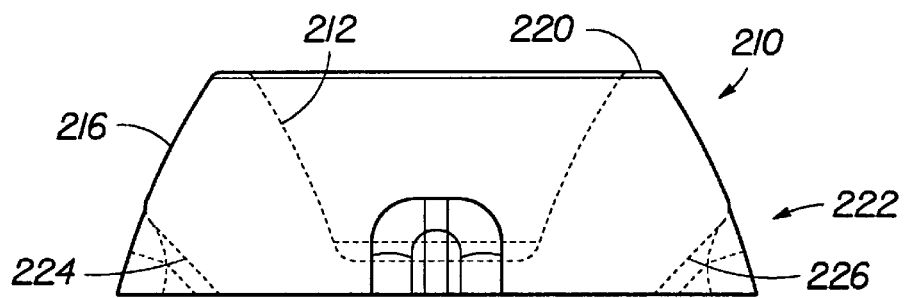

ANIMAL BOWL WITH RECESSED ACQUISITION FEATURE

BACKGROUND OF THE INVENTION

1. Field of the Invention

This invention relates to bowls, and more specifically to animal feeding bowls that are disposed for easy human manipulation while thwarting an animals ability to overturn or otherwise seize the bowls.

2. Description of the Prior Art

Bowls have existed for a long time and serve many different functions. Generally, the types of bowls within the scope of this invention include feeding and watering bowls for animals, such as dogs, cats, and farm animals.

There are many types of dog and cat bowls in the prior art. Most are molded hard plastic formed to define a cavity having a generally square or circular shape when viewed from above. Some prior art bowls have two cavities to contain both food and water for the animal. Typically the bowls are integrally formed wherein an inner wall defining the cavity is contiguous with a rim at the top of the cavity and the rim is contiguous with an exterior wall that terminates in a base edge that rests on the ground. In any event, the sides of the bowls, both around the inner cavity and the outer perimeter, are smooth and outwardly sloping from the rim to prevent the bowls from being grasped by an animals teeth. In other words, the sloped or flared smooth sides of the bowl hinder an animal from manipulating the bowl, i.e., overturning, picking up, etc., by biting down over the rim of the bowl.

It is generally most desirable to utilize hard plastic or a similarly hard material to prevent animals from biting or otherwise gripping the bowls. Alternative embodiments of prior art bowls are formed of stainless steel to prevent corrosion. Prior art bowls may also be fabricated of heavy clay for decorative purposes. Due to the added weight of the clay, such bowls are generally less susceptible to overturning, but more difficult for humans to manipulate.

Typically, prior art bowls can be grasped for manipulation by humans in several different ways. On the rim of a bowl, one can apply downward pressure with a thumb while using one of the other fingers to grasp the base edge of the bowl. Generally, this method is most effective when one's finger nails are long enough to slide between the base edge of the bowl and the ground so that the fingernails can be used in a lifting movement. A drawback to this method of manipulation is that one is apt to get miscellaneous debris, such as animal food or dirt, under one's fingernails. Another method for manipulating bowls is to use the thumb and at least one other finger in a pinching action, wherein one appendage is placed against the inner wall of the cavity and the other appendage is placed against the exterior wall of the bowl. A drawback to this method is that one is forced to place at least one appendage against the inside wall, where there is likely to be food, water, or some other viscous material adhering to the bowl. Not only is this undesirable from a sanitary standpoint, but this debris is likely to reduce the friction between the bowl and the finger's such that the bowl may be dropped.

One common feature of many prior art bowls is a raised lip around the outer perimeter of the bowl. This lip aids in grasping and manipulating the bowl by providing a protrusion around which a person can get one's finger or thumb. A drawback to such a feature is that it also serves as a protrusion around which an animal can easily maneuver a tooth or paw, permitting the animal to grasp or overturn the bowl. Similar protrusions, such as handles and the like, are also characterized by this same drawback. In addition, such features protruding generally from the bowl require additional space for deployment of the bowl.

SUMMARY OF THE INVENTION

The subject invention provides a bowl having acquisition features that permit the bowl to be manipulated by humans without providing protrusions that could be grasped by an animal, through biting or otherwise. The invention further provides a bowl that saves space by eliminating any conventional handle features. The invention further provides a bowl which precludes entanglement with persons, items, or devices within proximity to the bowl when the bowl is used in an industrial or automated environment by eliminating any conventional exterior handle or acquisition feature. In one embodiment, the acquisition feature is formed by two spaced apart slots recessed in the exterior wall of the bowl. Each slot is characterized by a first wall oriented to face the opposing slot and a second wall oriented to face the interior cavity. The first and second walls are preferably substantially vertical or negatively sloped. The thumb and a finger are placed in these slots against gripping surfaces and squeezed towards one another. The bowl may also be lifted by grasping between the thumb and fingers the interior wall of the cavity and the substantially vertical or negatively sloped second wall of a slot. A portion of the exterior wall adjacent each slot acts as shroud to protect the gripping the surfaces and to prevent an animal from positioning a claw, a tooth or a paw into the acquisition feature.

In another embodiment, at least one slot, having the natural curve and shape of a human finger, is recessed in the exterior surface of the bowl. The portion of the slot wall oriented to face the interior cavity is preferably substantially vertical or negatively sloped. The curved shape of the slot permits one to apply a lifting force on the bowl. In this configuration, the bowl is stabilize during lifting by placing the thumb on the rim of the bowl. The bowl may also be lifted by grasping the interior wall of the cavity and the substantially vertical or negatively sloped portion of the wall of the slot.

In other embodiments, the acquisition feature is an inwardly sloping slot recessed at the base edge of the bowl. The inwardly sloping portion of the slot may consist of a tab or a portion of the exterior wall of the bowl. Again, a thumb or finger disposed in the recessed slot can be used to apply a lifting force to the bowl while a stabilizing force is exerted on the bowl's rim.

BRIEF DESCRIPTION OF THE DRAWINGS

FIG. 9 is a sectional view of the embodiment shown in FIG. 7.

FIG. 10 is a top view of an embodiment of the invention in which the acquisition feature is a recessed slot having a negatively sloping surface defined therein.

FIG. 11 is a side view of the embodiment shown in FIG. 10.

DETAILED DESCRIPTION OF THE PREFERRED EMBODIMENTS

Figure 1:
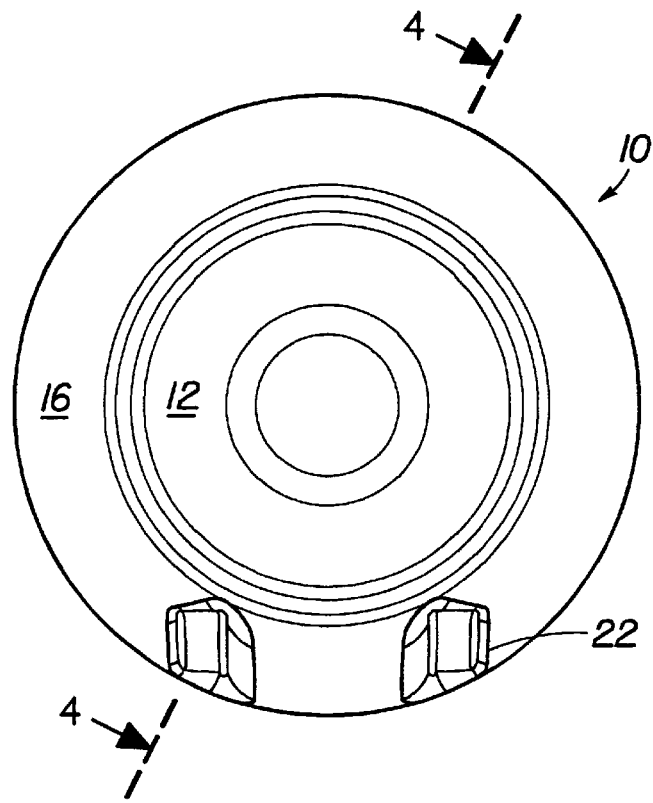
FIG. 1 is a top view of an embodiment of the invention in which the acquisition feature is formed by two spaced apart slots recessed in the exterior wall of the bowl
Figure 2:
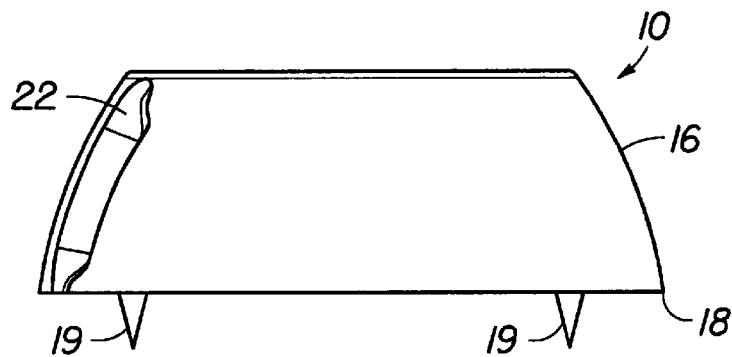
FIG. 2 is a side view of the embodiment shown in FIG. 1.
Figure 3:
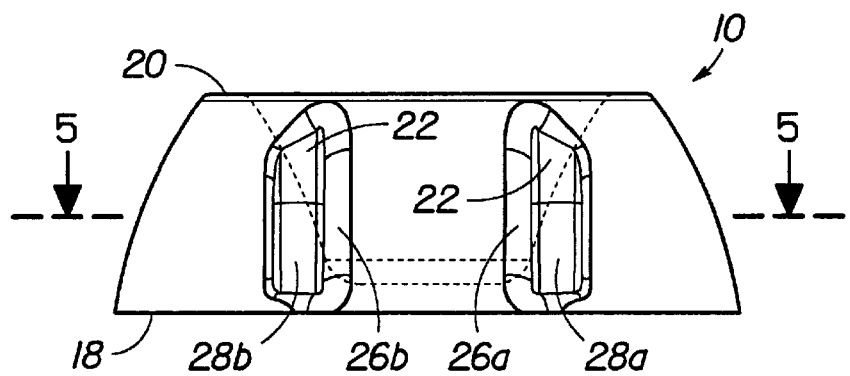
FIG. 3 is a front view of the embodiment shown in FIG. 1.
Figure 4:
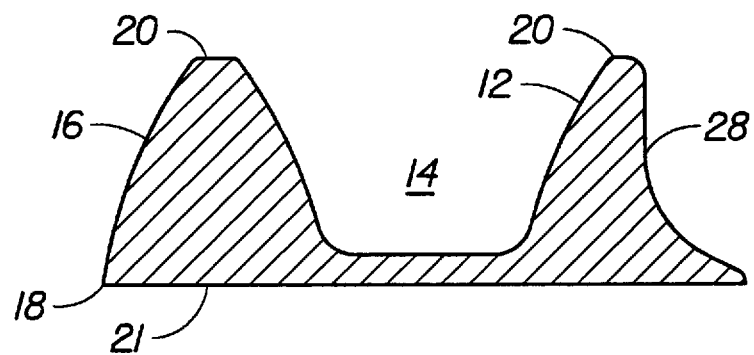
FIG. 4 is a sectional view of the embodiment shown in FIG. 1.

A bowl of the present invention is shown in FIGS. 1–4 and generally designated as 10. Bowl 10 is defined by interior wall 12 forming a cavity 14, an exterior wall 16 that terminates in a base edge 18, a rim 20 joining interior wall 12 and exterior wall 16, and a recessed acquisition feature 22 provided in exterior wall 16. Interior wall 12 and exterior wall 16 are generally flared or outwardly sloping from rim 20 to prevent an animal from biting down over rim 20 and lifting bowl 10 with the animal's teeth. Those skilled in the art will understand that the greater the slope of walls 12 and 16, the more difficult it becomes for an animal to lift bowl 10 in this manner. Bowl 10 may also be provided with spikes 19 extending downward from the bottom 21 of bowl 10.

Figure 5:
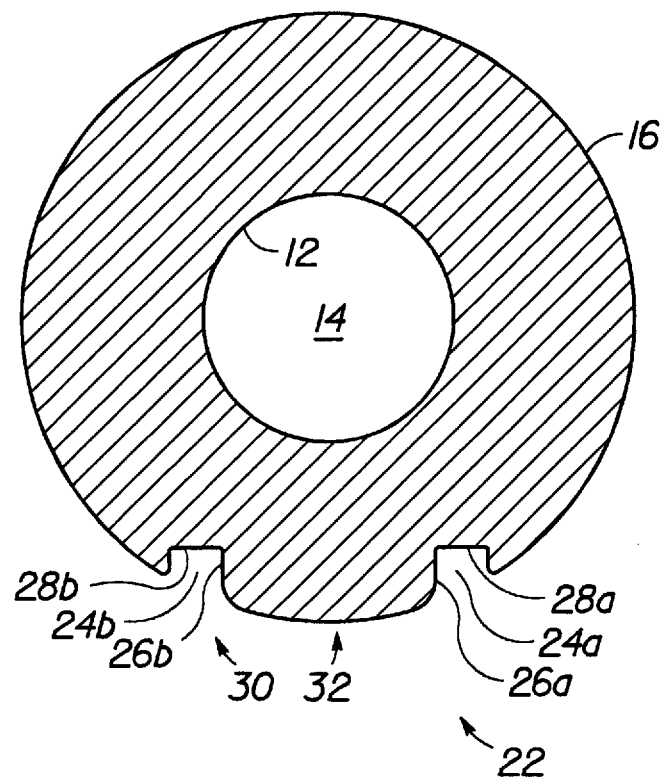
FIG. 5 is a top sectional view of the embodiment shown in FIG. 3.
Figure 6:
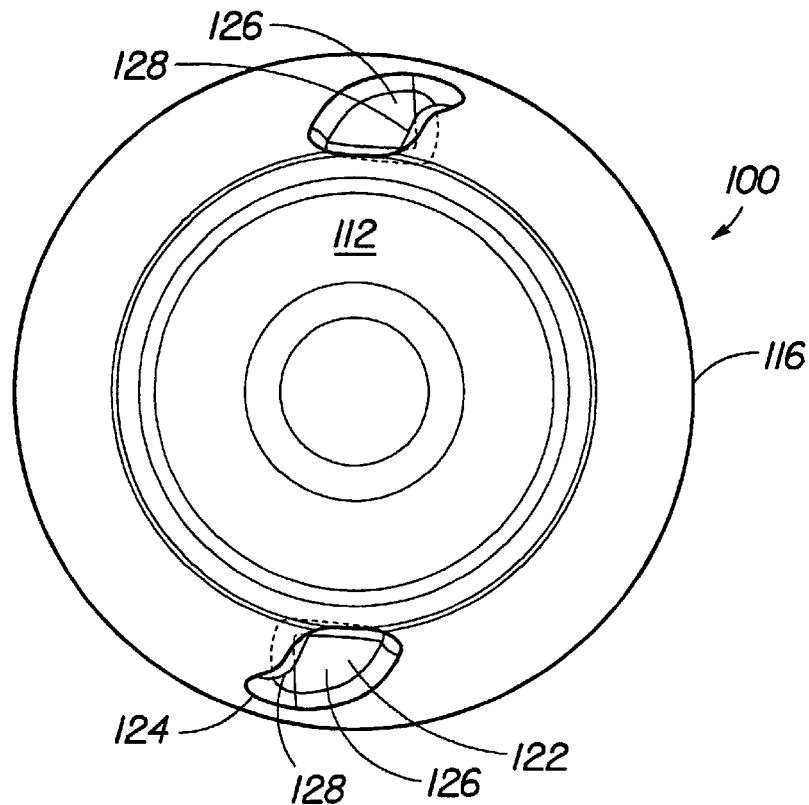
FIG. 6 is a top view of an embodiment of the invention in which the acquisition feature is a recessed slot shaped to the natural curve of a finger.
Figure 7:
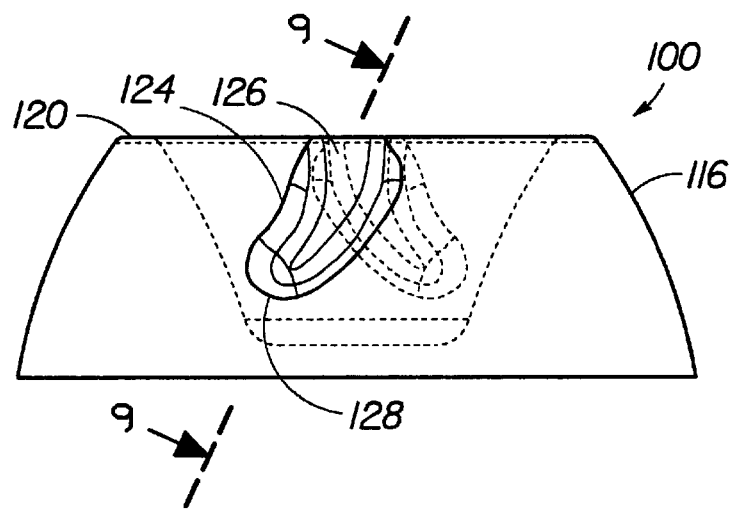
FIG. 7 is a side view of the embodiment shown in FIG. 6.
Figure 8:
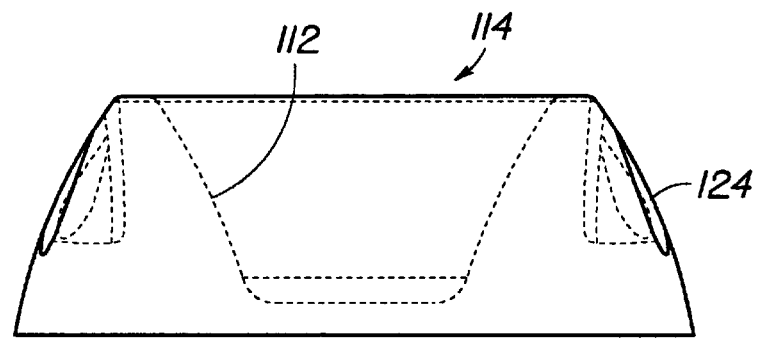
FIG. 8 is a front view of the embodiment shown in FIG. 6.

Acquisition feature 22 is recessed within exterior wall 16 and formed by two spaced apart slots 24a, 24b. Each slot 24 is characterized by a first wall 26 oriented to face the opposing slot and a second wall 28 oriented to face interior cavity 14. First and second walls 26, 28 are preferably substantially vertical or negatively sloped, i.e., sloped inward toward the axis of bowl 10. For example, in FIG. 4, wall 28 is substantially vertical. The intersection of walls 26 and 28 with each other as well as with other parts of bowl 10, such as exterior wall 16, is preferably curvilinear to enhance ergonomics and manufacturing (such as during injection molding). The width 30, see FIG. 5, of each slot 24 is sized only large enough to accommodate a human finger or thumb, such that an animal would be unable to insert a snout, a tooth, or a paw into slot 24 and overturning bowl 10. In addition, the spacing 32 between slots 24a and 24b is preferably greater than an animal's maximum mouth opening such that an animal is prevented from closing its mouth down over the portion of exterior wall 16 between slots 24a and 24b. In the event that spacing 32 is not greater than an animal's maximum mouth opening, the animal will still be unable to grasp bowl 10 because of the narrow width 30 of slots 24a and 24b. Since slot 24 is recessed inside exterior wall 16, exterior wall 16 functions as a shroud to reduce the amount of debris or fluid that could accumulate on walls 26 and 28 and to prevent an animal from hooking a tooth or paw within slot 24. To further enhance one's ability to grip walls 26 and 28, the walls may be textured or shaped.

Acquisition feature 22 permits bowl 10 to be grasped and raised in several different ways while still accomplishing the objectives of the invention. First, slots 24a and 24b may be used in conjunction with one another by placing the thumb and a finger in the slots and utilizing first walls 26a, 26b as gripping surfaces. The thumb and the finger are squeezed together to exert a compressive force on first walls 26a, 26b, permitting one to raise bowl 10. Alternatively, bowl 10 may be raised by grasping interior wall 12 and second wall 28 between the thumb and fingers. Unlike the prior art bowls, second wall 28 is substantially vertical or negatively sloped such that the finger or thumb gripping interior wall 12 need not be extended into cavity 14 as far as would be necessary with the prior art bowls. As the slope of second wall 28 decreases, one's ability to grasp bowl 10 without the need to insert a finger or thumb deep into cavity 14 increases. This method is much less reliant on friction than prior art bowls due to the substantially vertical or negatively sloped surface upon which the finger or thumb rests.

The recessed nature of acquisition feature 22 has several advantages. As indicated above, such a configuration renders it difficult for an animal to manipulate bowl 10. In addition, the profile of bowl 10 is minimized, such that bowl 10 requires less space for deployment. Finally, the lack of protruding features renders it less likely that bowl 10 will be overturned or otherwise disturbed due to accidental bumping or entanglement by individuals and animals.

Spikes 19 are desirable for anchoring bowl 10 into the ground, hindering unwanted manipulation or movement.

An alternative embodiment of the invention is shown in FIGS. 6, 7, 8, and 9 and designated as bowl 100. Bowl 100 is defined by interior wall 112 forming an interior cavity 114, an exterior wall 116 that terminates in a base edge 118, a rim 120 joining interior wall 112 and exterior wall 116, and a recessed acquisition feature 122 provided in exterior wall 116. Interior wall 112 and exterior wall 116 are generally flared or outwardly sloping from rim 120 to prevent an animal from biting down over rim 120 and lifting bowl 100 with the animal's teeth.

Acquisition feature 122 is recessed and formed of a slot 124, having the natural curve and shape of a human finger. Specifically, slot 124 is recessed in the exterior surface of the bowl and is defined by a first wall 126 and a second wall 128. First slot wall 126 is oriented to face interior cavity 114 and is preferably substantially vertical or negatively sloped. Second slot wall 128 is curved to conform to the natural curve of the human finger. The intersection of walls 126 and 128 with each other as well as with other parts of bowl 100, such as exterior wall 116, is preferably curvilinear to enhance ergonomics and manufacturing. To further enhance one's ability to grip walls 126 and 128, the walls may be textured.

Again, acquisition feature 122 permits bowl 100 to be grasped and raised in several different ways while still accomplishing the objectives of the invention. First, the curve of slot 124 permits one to apply a lifting force on bowl 100. Using this method, bowl 100 may be stabilized during raising by placing the thumb on rim 120. Alternatively, bowl 100 may be raised by grasping interior wall 112 and first wall 126 between the thumb and fingers. Unlike the prior art bowls, first wall 126 is substantially vertical or negatively sloped such that the finger or thumb gripping interior wall 12 need not be extended into cavity 114 as far as would be necessary with the prior art bowls. Those skilled in the art will understand that unlike the first embodiment, only a single slot 24 is required in the second embodiment to achieve the purposes of the invention. However, additional slots may be included to enhance ease of use. The curved nature of slot 124 permits a lifting force to be applied against second wall 128, obviating the need for a second slot having a similar gripping surface.

Figure 12:
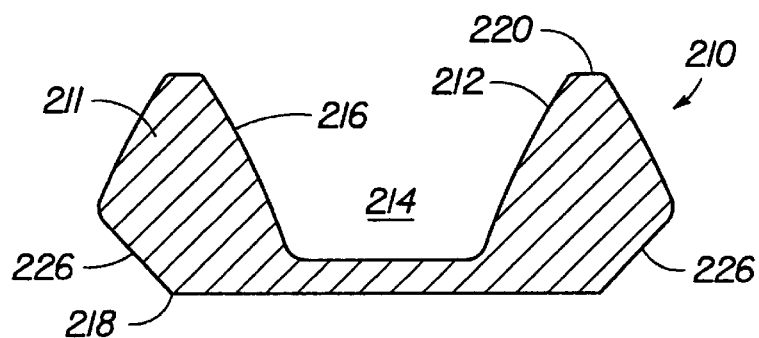
FIG. 12 is a sectional view of the embodiment shown in FIG. 10
Figure 13:
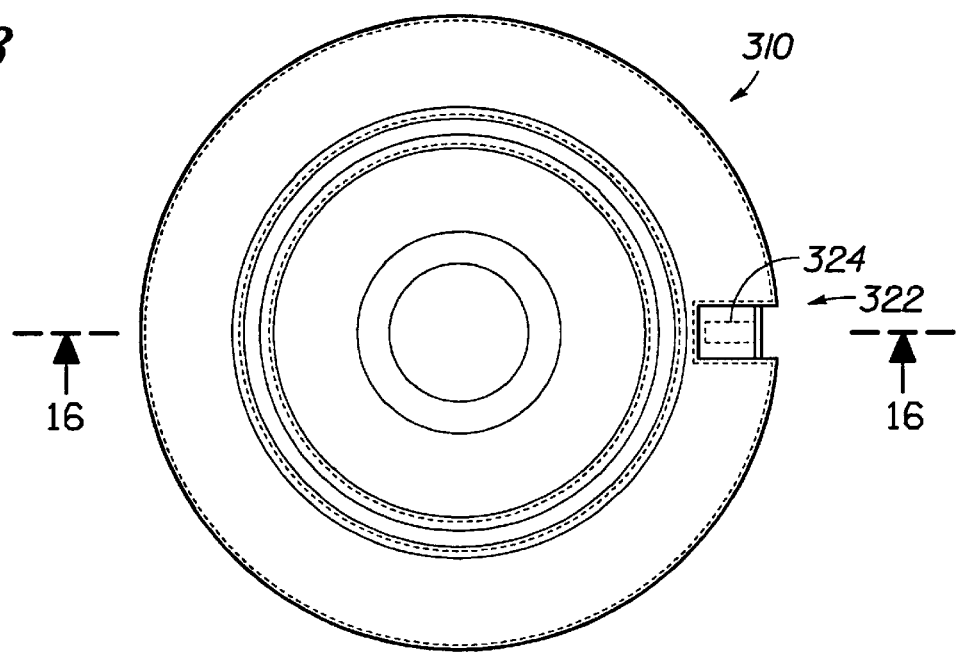
FIG. 13 is a top view of an embodiment of the invention in which the negatively sloping surface of the recessed slot forming the acquisition feature is an injection molded tab.
Figure 14:
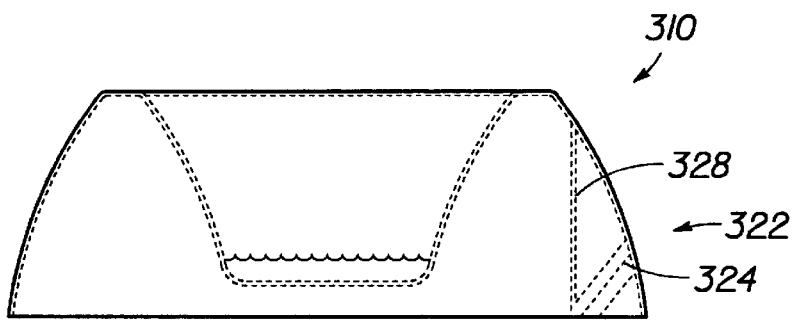
FIG. 14 is a side view of the embodiment shown in FIG. 13.
Figure 15:
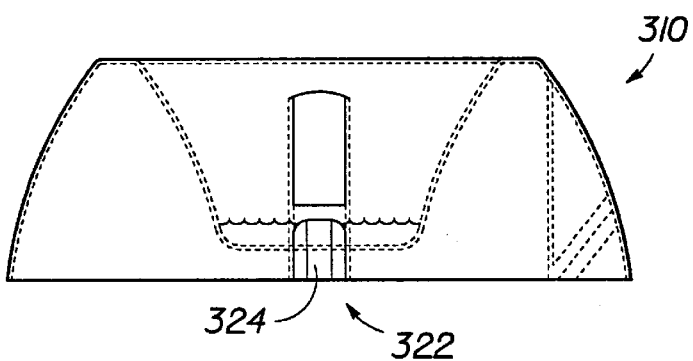
FIG. 15 is a front view of the embodiment shown in FIG. 13.

The acquisition features of the third embodiment, shown in FIGS. 10, 11 and 12, and the fourth embodiment, shown in FIGS. 13, 14, 15, and 16, each utilize an inwardly or negatively sloping surface recessed at the base edge of the bowl. In the third embodiment, a bowl 210 is characterized by a solid body 211 (FIG. 12), the surface of which is defined by an interior wall 212 that forms cavity 214, an exterior wall 216 that terminates in a base edge 218, a rim 220 joining interior wall 212 and exterior wall 216, and a recessed acquisition feature 222 provided in exterior wall 216. Interior wall 212 and exterior wall 216 are generally flared or outwardly sloping from rim 220 to prevent an animal from biting down over rim 220 and lifting bowl 210 with the animal's teeth.

Acquisition feature 222 is recessed within bowl 210 and formed of a slot 224 extending inwardly from the surface of exterior wall 216 at base edge 218. A portion 216' of wall 216 slopes inward from the overall surface of exterior wall 216 to form the negatively sloping surface 226 shown in FIG. 12. The intersection of slot 224 with other parts of bowl 210, such as exterior wall 216, is preferably curvilinear to enhance ergonomics and manufacturing. In addition, surface 226 may be textured or contoured to conform to the natural curve of the human finger, such that one's ability to grip surface 226 is further enhance.

Acquisition feature 222 permits bowl 210 to be grasped and raised utilizing a lifting force. Specifically, a finger may be inserted into slot 224 to apply an upward lifting force against surface 226. In this method, bowl 210 is stabilize during raising by placing the thumb on rim 220. Those skilled in the art will understand that unlike the first embodiment, only a single slot 224 is required in the third embodiment to achieve the purposes of the invention. The negatively sloped nature of surface 226 permits a lifting force to be applied to bowl 210, obviating the need for a second slot having a similar gripping surface. However, additional acquisition features 222 may be provided to enhance ease of use. In any event, this embodiment minimizes reliance on friction due to the substantially negatively sloped surface 226.

In this embodiment, bowl 210 is formed to have a substantially solid body 211, as shown in FIG. 12, adding weight to bowl 210 and rendering it more difficult for an animal to manipulate. Negatively sloped surface 226 defines a portion of the periphery of solid body 211. Because of the solid nature of bowl 210, this embodiment is best manufactured from clay, ceramic, or concrete, or alternatively, from plastic using rotomolding or blowmolding.

In the forth embodiment shown in FIGS. 13, 14, 15, and 16, a bowl 310, substantially similar to bowl 210 of the third embodiment, is shown. Unlike bowl 210 however, bowl 310 is defined by a thin-walled shell 311 (FIG. 16) rather than solid body 211. In any event, the features of bowl 310 are similar to bowl 210. Specifically, thin walled shell 311 is shaped to have an interior wall 312 that forms a cavity 314, an exterior wall 316 that terminates in a base edge 318, a rim 320 joining interior wall 312 and exterior wall 316, and a recessed acquisition feature 322 provided in exterior wall 316. Interior wall 312 and exterior wall 316 are generally flared or outwardly sloping from rim 320 to prevent an animal from biting down over rim 320 and lifting bowl 310 with the animal's teeth.

Figure 16:
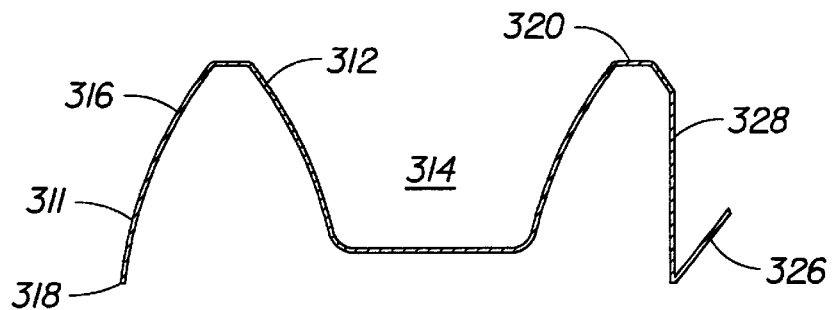
FIG. 16 is a sectional view of the embodiment shown in FIG. 13.

Acquisition feature 322 is recessed within bowl 310 and formed of a slot 324 extending inwardly from the surface of exterior wall 316 at base edge 318. Slot 324 includes a tab 326 extending from a first wall 328. Tab 326 is formed to have a negatively sloping surface as shown in FIG. 16. First wall 328 is preferably substantially vertical to permit the negative slope of tab 326 to be maximized without protruding past exterior wall 316. The intersection of slot 324 with other parts of bowl 310, such as exterior wall 316, is preferably curvilinear to enhance ergonomics and manufacturing. In addition, the surface of tab 326 may be textured or contoured to conform to the natural curve of the human finger, such that one's ability to grip surface 326 is further enhance.

In this embodiment, bowl 310 is formed of a thinwalled shell 311, including tab 324. Such a configuration enhances manufacture by permitting bowl 310 to be formed by a plastic injection molding process, thus minimizing expense and manufacture time.

Those skilled in the art will understand that the invention is not limited to the substantially circular shapes shown in the Figures. The bowls of the invention may be of any desired shaped. In addition, the bowls may be formed to have multiple cavities, such as for example, a cavity for containing food and a cavity for containing water.

While certain features and embodiments of the invention have been described in detail herein, it will be readily understood that the invention encompasses all modifications and enhancements within the scope and spirit of the following claims.

What is claimed is:

1. A bowl for resting on a surface, said bowl comprising:
   a. an interior wall forming a cavity;
   b. an exterior wall that terminates in a base edge, the base edge resting adjacent said surface;
   c. a rim joining said interior wall and said exterior wall, wherein said interior wall and said exterior wall are generally outwardly sloping from said rim; and
   d. an acquisition feature recessed in said exterior wall, wherein said acquisition feature comprises first and second spaced apart, opposing slots, each slot having a first wall oriented to substantially face the opposing slot and a second wall oriented to substantially face said interior cavity.

2. The bowl of claim 1, wherein at least one of said first and second walls is substantially vertical.

3. The bowl of claim 1, wherein at least one of said first and second walls is negatively sloped.

4. The bowl of claim 1, wherein the intersection between at least one of said first and second walls and said exterior wall is curvilinear.

5. The bowl of claim 1 wherein at least one of said first and second walls is textured.

6. A bowl for resting on a surface, said bowl comprising:
   a. an interior wall forming a cavity;
   b. an exterior wall that terminates in a base edge, the base edge resting adjacent said surface;
   c. a rim joining said interior wall and said exterior wall, wherein said interior wall and said exterior wall are generally outwardly sloping from said rim; and
   d. an acquisition feature recessed in said exterior wall, wherein said exterior wall forms a shroud over a portion of said acquisition feature.

7. The bowl of claim 6 further comprising a bottom surface adjacent said base edge and at least one spike extending downward from said bottom surface.

8. A bowl for resting on a surface, said bowl comprising:
   a. an interior wall forming a cavity;

b. an exterior wall that terminates in a base edge, the base edge resting adjacent said surface;

c. a rim joining said interior wall and said exterior wall, wherein said exterior wall is generally outwardly sloping from said rim; and d. an acquisition feature comprising a downwardly curving recess on the surface of said exterior wall adapted for accommodating a human finger, said recess defined along a substantially vertical centerline, the recess having a first end along said centerline, the first end being open and terminating adjacent said rim and a second end terminating in said exterior wall adjacent said base, the terminus of said second end offset from said centerline, wherein said downwardly curving recess is curved to conform to the natural curve of the human finger.

9. The bowl of claim 8, wherein said recess is defined by a first wall and a second wall, wherein said first wall is oriented to substantially face said interior cavity and said second wall is downwardly curving, wherein at least one of said first and second walls is substantially vertical.

10. The bowl of claim 9, wherein the intersection between at least one of said first and second walls and said exterior wall is curvilinear.

11. A bowl for resting on a surface, said bowl comprising:

a. an interior wall forming a cavity;

b. an exterior wall that terminates in a base edge, the base edge resting adjacent said surface;

c. a rim joining said interior wall and said exterior wall, wherein said exterior wall is generally outwardly sloping from said rim; and d. an acquisition feature comprising a slot recessed in said exterior wall at said base edge and extending inward from said exterior wall, said slot defined by side walls and a negatively sloping, downwardly facing upper wall, all of said walls formed from a portion of said exterior wall, wherein said negatively sloping, downwardly facing upper wall is disposed for application of a lifting force to lift said bowl.

12. The bowl of claim 11, wherein said interior wall, said rim and said exterior wall define a solid body.

13. The bowl of claim 12 wherein said solid body is formed of concrete.

14. A bowl for resting on a surface, said bowl comprising:

a. an interior wall forming a cavity;

b. an exterior wall that terminates in a base edge, the base edge resting adjacent said surface;

c. a rim joining said interior wall and said exterior wall, wherein said exterior wall is generally outwardly sloping from said rim; and d. an acquisition feature comprising a negatively sloping surface recessed in said exterior wall at said base edge, wherein said negatively sloping surface is a tab.

15. The bowl of claim 14 further comprising a substantially vertical first wall defined within said recessed surface, wherein said tab extends from said first wall.

16. The bowl of claim 14, wherein said interior wall, said rim, said exterior wall and said tab are integrally formed of a thin-wall.

17. The bowl of claim 16 wherein said bowl is formed of injection molded plastic.

* * * * *